May 24, 1960
C. VOLFF ET AL
2,938,108
ARC WELDING ELECTRODE
Filed May 20, 1958
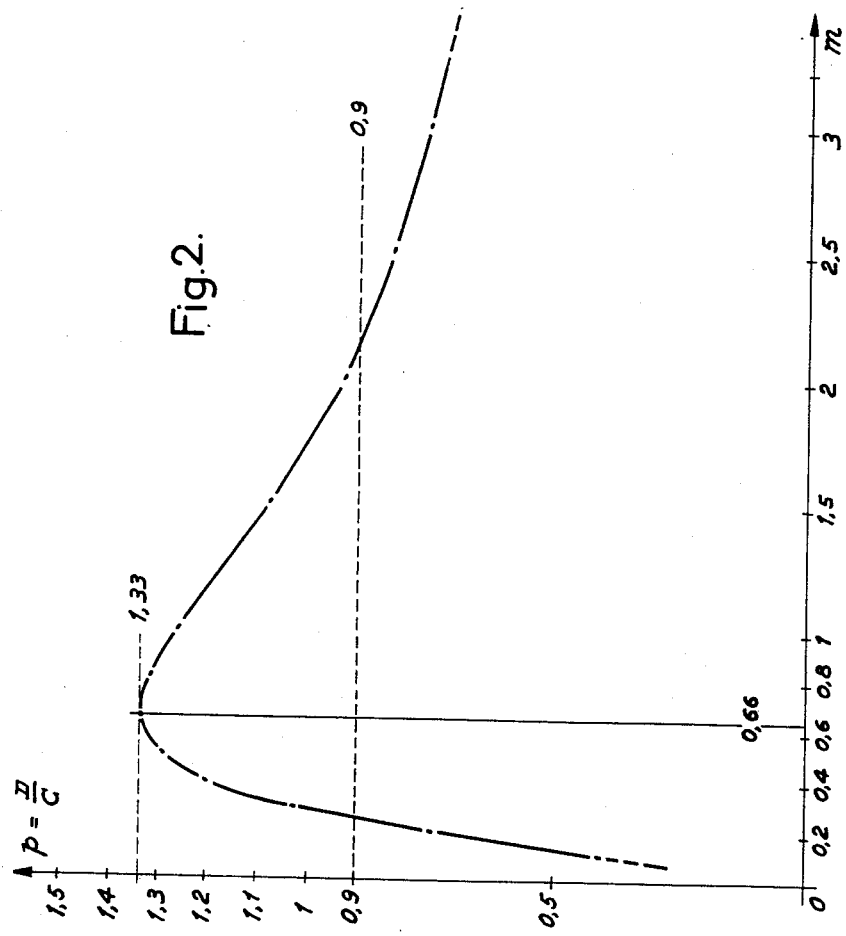
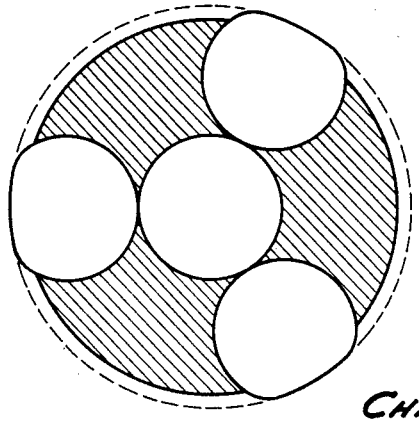
Inventors
CHARLES VOLFF
GUY SAVARD
BY *Alan Swabey*
Attorney

United States Patent Office 2,938,108
Patented May 24, 1960

2,938,108

ARC WELDING ELECTRODE

Charles Volff, Sevres, France, and Guy Savard, Vaudreuil, Quebec, Canada; said Guy Savard assignor to l'Air Liquide, Societe Anonyme pour l'Etude et l'Exploitation des Procedes Georges Claude, Paris, France Filed May 20, 1958, Ser. No. 736,633

Claims priority, application France May 29, 1957

9 Claims. (Cl. 219—146)

This invention relates to continuous semi-coated stranded electrodes for use in semi-automatic arc welding, by means of a hand gun to which a fusible electrode is continuously supplied from a reel. Such electrodes should preferably be very fusible, and capable of being unwound from a reel at a relatively high speed. They should also be capable of carrying an amount of flux sufficient for a high-quality weld, and this flux should adhere strongly to the flexible wires forming the electrode while leaving sufficient bare surfaces on these wires for proper electrical contact with a contact tube connected with the welding current source.

According to the present invention, there is provided a continuous semi-coated electrode comprising a core wire, a plurality of wires helically wound about said core, and continuous flux ribbons in the intervals or grooves between said wires, this electrode being characterized by said wires having sufficiently little electrical contact together for keeping the flow of current from one wire to another substantially below the amperage necessary for sustaining a welding arc.

For practical purposes, a stranded electrode according to the invention will be satisfactory when it can be ascertained, for instance by high-speed motion pictures, or by oscillography, that the electrode end of the arc is transferred in quick succession from one wire to the other, the frequency of such arc transfer being for instance of the order of 200 times per second or more. It will then also be observed that a spray-type transfer of metal takes place, which is similar to that obtained in inert-gas shielded arc welding with a fusible electrode and a high current density. This type of metal transfer, in very fine droplets, had never been observed heretofore with semi-coated electrodes, and it appears therefore as the manifestation of a novel and original feature of the electrode according to the present invention. It occurs both with direct current and with alternating current, and it allows welding in all positions, including overhead, whereas prior semi-coated electrodes produced a metal transfer in large drops so that they could only be used in downhand welding. This favorable effect of the invention may probably be ascribed to the fact that each elementary wire of the electrode is subjected periodically to a high density of current. Remarkably enough, this effect is obtained with a moderately high current density when this density is considered with reference to the total metal cross-section of the stranded electrode. Also, a substantial increase is obtained in the fusion rate, that is in the amount of electrode metal molten per ampere and per unit of time.

According to an embodiment of the invention, the core wire bears a thin insulating coating, which may be simply a thin oxide coating of the kind usually present, as a residue, on metal wires after drawing. By way of example, the contact resistance measured in electrodes according to the invention between the core wire and the outer wires averaged about 0.1 ohm, the lower limit being about 0.04 ohm and the upper limit about 0.2 ohm. With large currents, this contact resistance will cause a sufficient voltage drop for preventing a welding arc being permanently maintained between the core wire and the work.

For instance, with 250 amperes welding current a resistance as low as 0.04 ohm, will cause a voltage drop of 10 volts, which appears ample for obtaining the transfer of the arc from one wire to another, in quick succession, which is typical of the electrodes according to the invention.

It is also to be noted that the geometrical structure of the electrodes according to the invention, in which the core wire is surrounded by a small number of helically wound outer wires, for instance only three outer wires according to a preferred embodiment, is such that the contact areas between the core wire and the outer wires are very small, and consequently offer a non-negligible amount of electrical resistance, even in the absence of insulation on the core wire. Another property of this geometrical structure is that the peripheral wires are widely separated from one another by large flux-filled grooves. Since usual fluxes are rather poor electrical conductors, this is another useful factor for obtaining the desired electrical resistance between the individual wires. On the other hand, it is desirable to achieve very good contact between the outer bare edges of the peripheral wires and the contact tube of the welding gun. To this effect, the peripheral wires are preferably shaped, according to an embodiment of the invention, so as to be tangent over a substantial arc to the circle circumscribing the bundle of wires.

The invention will be further described with reference to the appended drawing in which:

Figure 1 is a diagrammatic transverse cross-section of a stranded electrode according to the invention.

Figure 2 is a graph illustrating the variations of the ratio: volume of flux to volume of metal, in an electrode of the type shown Figure 1, as a function of the ratio between the diameters of the core wire and of the outer wires, respectively.

The electrode shown in transverse cross-section Figure 1 comprises a core wire surrounded by three peripheral wires, with a large volume of flux present between the outer wires. An explained hereinabove, the outer edges of the peripheral wires are bare of flux, and are preferably shaped, for instance by swaging, so as to offer large arcs of tangency with the circle, shown in dotted line, circumscribing the bundle of wires. Also, preferably, there is provided, between the flux ribbons and this circumscribing circle, a gap, as shown Figure 1, sufficient for substantially reducing abrasion of the contact tube of the welding gun by friction with the flux, while the large contact areas on the outer wire edges are also effective in keeping down the wear of the contact tube as well as the heating of this tube. In fact, large welding current may be used without requiring the welding gun to be water-cooled.

In order to incorporate to the electrode a volume of flux as large as possible, while maintaining a very good adherence of this flux to the metal wires, a preferred embodiment of the electrode according to the invention is one in which a core wire is surrounded by three outer wires having substantially the same cross-section, the cross-sectional area of these outer wires being comprised between 0.64 and 2.25 times the cross-sectional area of the core wire, the preferred range being from 0.8 to 1.5 times. This relationship does not only provide the possibility to incorporate a large volume of flux, but also affords a very good adherence of the flux because the flux ribbons are held between the wires by a sort of dovetail fit, as visible Figure 1. This feature minimizes shedding of the flux during handling of the coiled electrode and while welding. The advantage of choosing a proper relationship between the diameter of the core wire and that of the outer wires is illustrated by the graph of Figure 2, in which the ratio $m$ between the radius B of an outer wire and the radius A of the central wire is plotted as a function of the ratio $p$ between the cross-sectional area D of the flux and the cross-sectional area C of the metal wires, according to the equation $$p = \frac{m^2 + 4m}{3m^2 + 1}$$

This equation is derived in the following manner: taking $$m = \frac{B}{A}$$

and $$p = \frac{D}{C}$$

$$D = \pi(A+2B)^2 - A^2 - 3\pi B^2$$

$$C = \pi A^2 + 3\pi B^2$$

Hence, $$p = \frac{\pi(B^2 + 4AB)}{\pi(A^2 + 3B^2)} = \frac{B^2 + 4AB}{A^2 + 3B^2}$$

By substituting for B the equivalent expression $$mA = \frac{B}{A} \times A$$

there is obtained:

$$p = \frac{m^2 A^2 + 4mA^2}{A^2 + 3m^2 A^2} = \frac{m^2 + 4m}{3m^2 + 1}$$

A few typical values are noted hereafter:

| for $m=0.10$ | $p=0.40$ | for $m=0.66$ | $p=1.33$ |
|---|---|---|---|
| 0.20 | 0.75 | 0.80 | 1.31 |
| 0.30 | 1.02 | 1.00 | 1.25 |
| 0.40 | 1.20 | 1.50 | 1.07 |
| 0.50 | 1.28 | 2.00 | 0.92 |
|  |  | 4.00 | 0.65 |

With $m=0.66$, $p$ reaches its maximum value $p=1.33$. For all the values of $m$ ranging between 0.25 and 2, $p$ remains larger than 0.9 and therefore the volume of flux in the electrode is substantially equal to the volume of metal or even slightly larger.

Taking for example a flux material having a specific gravity of about 2.5, the weight of the flux coating, in a steel electrode, will be about 30% of the total weight of the electrode, that is two or three times as much as in prior types of continuous semi-coated stranded electrodes. In practice, good results will be obtained with a steel electrode according to the invention containing from 15 to 25% flux, by weight. From the standpoint of the flux adherence as also of the electrical contact between the electrode and the welding current feed member, the higher values of $m$, comprised for instance between 1 and 1.5 appear preferable. With these values, the ratio of the cross-sectional areas is comprised between 1 and 2.25 as the area is proportional to the square of the radius. The outer wires are therefore preferably of the same diameter as the core wire, or slightly thicker, which also provides the greatest flexibility of the electrode for a given weight of metal per unit length.

It will be apparent from the foregoing that the electrode according to the invention is fundamentally different in its principle from most of the prior semi-coated electrodes, in which a thick core wire was surrounded by thinner outer wires, one important function of which was to form an electrical bridge between the core wire and the welding current feed member. Accordingly, in those prior electrodes, it was deemed necessary to keep the electrical resistance between the core wire and the outer wires as low as possible, whereas with the present invention this resistance should not be smaller than about 0.04 ohm, and preferably not substantially smaller than about 0.2 ohm. This feature appears to be effective for causing the arc to be transferred in very quick succession from one wire to another, as each of them shortens in turn by melting.

By way of example, the desired type of fusion in fine droplets has been obtained with an electrode according to the invention, formed of four mild steel wires of 1.2 mm. diameter, each, with a welding current of 250 amperes and an arc voltage of 30 volts. The apparent current density, was therefore 62 A./sq. mm., the metal section being 4.5 sq. mm. However, since all the current appears to pass successively through each wire individually, the actual current density would then be 250 A./sq. mm., a value similar to those encountered in inert gas shielded arc welding with a fusible electrode. Also, a possible explanation for the substantial increase noted in the fusion rate is probably that the core wire is molten chiefly by the heat of the arc between the workpiece and the outer wires.

The electrode according to the invention has been found suitable for outdoor use. It may also find use in argon-shielded welding, and, quite advantageously, in an atmosphere of carbon dioxide, where its abundant flux coating will provide favorable metallurgical effects.

Finally, according to a modified form of the electrode of the invention, the electrode may comprise outer wires in two or three concentric layers wound in opposite directions, the inner layer comprising 3 wires and the outer layer or layers 3 or 4 wires each, these wires having substantially the same cross-sectional area and being evenly spaced, the cross-sectional area of each outer wire being comprised between about 0.64 and 2.25 times the cross-sectional area of the core wire. This ratio of areas will be obtained, with wires of circular cross-section having a ratio of diameters comprised between 0.8 and 1.5.

This modified embodiment of the invention is particularly appropriate when thick electrodes of great flexibility are desired, and for providing a further increase of the flux volume relatively to the metal volume in the electrode.

For instance, a 7-wire electrode, comprising two concentric layers of 3 wires each wound upon a core wire, may contain a volume of flux comprised between 72% and 90% of the volume of metal, while a 10-wire electrode, comprising 3 concentric layers of 3 wires each may contain a volume of flux comprised between 90% and 120% of the volume of metal.

The very large volume thus available for flux makes it possible to incorporate to the flux substantial amounts of addition alloys, or of iron powder or other non-fluxing materials. Also, these thicker electrodes carry higher currents, and this in turn results in higher melting rates, so that the weight of electrode fused per hour may reach or even exceed twice the weight of coated rod electrodes which would be fused in the same type of operation. This weight varies from 15 to 30 lbs. of electrode per hour, as compared with about 10 to 16 lbs. per hour with conventional rod electrodes. Another advantage of the multilayer embodiments (7 to 10 wires) of the electrode of the invention is that the frequency of arc transfer from one wire to another increases with the number of wires, and that the arc stability is also increased thereby.

One important feature in each embodiment of the electrode of the invention is that the wires are wound with a substantially dead lay. This feature is important for obtaining an even feed of the electrode and for preventing it from wobbling from one side to the other as it comes out of the welding gun nozzle, as such wobbling would produce an uneven arc. The 7-wire electrode is specially favorable in this respect, owing to the two outer layers of three wires each being wound in opposite directions. It is also possible that the dead lay winding plays a useful part in reducing the electrical conductivity between the core wire and the outer wires because the contact pressure between these wires is more uniformly small owing to the dead lay.

The pitch of twist is preferably comprised between 4 and 8 turns per inch, a preferred value being approximately 6 turns per inch. With a longer pitch, there is more room for flux, but it will be more difficult to prevent shredding of the flux during handling and while welding. Effective means to prevent this shredding are to make the flux with very finely ground ingredients, and to allow the binder to remain slightly plastic, which may be obtained by drying the flux without baking.

The preferred wire diameter is comprised between about 25 and 75 mils, a preferred range being from 36 to 50 mils, which enables the electrode to be coiled on a standard spool such as used for instance in "Sigma" welding or similar semi-automatic processes with an inner coiling radius as small as about 4 inches, and to be unwound from such a coil without causing shredding of the flux.

In order to facilitate the choice of the proper pitch for winding together the wires forming the electrode, this pitch will generally be satisfactory when the tangent to an outer wire makes an angle comprised between about 30 and 45 degrees with the electrode axis.

While the composition of the flux coating may vary widely, it has been found that a flux containing from 20 to 35% rutile, by weight, could give good results in conjunction with mild steel wires, for the welding of ordinary mild steel.

One advantage of the electrode of the invention is that it lends itself conveniently to the practice of "backhand" welding, that is welding with the gun moving against the direction of electrode feed.

One specific example relating to the 4-wire alternative form of the invention will be given: the electrode comprised a core wire and three outer wires all of the same diameter, namely 45 mils. The pitch was 6 turns to the inch, or 1.85 diameters. The electrode was wound with a dead lay, and was coiled on a spool containing 30 lbs., that is about 1050 feet. The electrode feed rate was about 100 to 110 inches per minute, and the arc voltage 30 volts. The current was about 280 to 320 amperes for downhand welding, and for vertical position welding, a smaller current was used. The practical current range in downhand welding appears to vary between 200 amperes minimum for an electrode with 4 wires of 40 mils diameter and 400 amperes maxmium for 4 wires of 50 mils diameter.

This application is a continuation-in-part of application Serial No. 679,264, filed August 20, 1957.

What we claim is:

1. A continuous stranded electrode for arc welding, comprising a core wire, a wrapping consisting of from one to three helically wound concentric layers of evenly spaced wires, the winding senses of adjacent layers being opposite, and fluxing material in the intervals of said wires leaving a portion of the outer surface of said wrapping exposed for electrical contact, the diameter of the core wire being between about 25 mils and about 75 mils, each wrapping layer comprising from three to four wires having an individual cross-sectional area being between about 0.64 and 2.25 times the cross-sectional area of the core wire, the winding pitch angle with the electrode axis being between about 30° and 45°, and the volume of said flux material being at least 72 percent of the volume of said wires.

2. An electrode as defined in claim 1, in which the electrical contact resistance between the core wire and the wrapping wires is between about 0.04 ohm and 0.2 ohm.

3. An electrode as defined in claim 1, in which the wires are stranded with a substantially dead lay.

4. An electrode as defined in claim 1, in which the cross-sectional area of the wrapping wires is between about 0.8 and 1.5 times the cross-sectional area of the core wire.

5. An electrode as defined in claim 1, in which all the wrapping wires have substantially the same section as the core wire.

6. An electrode as defined in claim 1, in which the diameter of all wires is between about 36 and 50 mils.

7. An electrode as defined in claim 1, in which the layer of outer wires immediately surrounding the core wire consists of three wires having substantially the same cross-sectional area as the core wire.

8. A continuous semi-coated stranded electrode for semi-automatic arc welding comprising a core wire, a plurality of wires helically wound about said core, and continuous flux ribbons in the intervals between said wires, in which said wires have sufficiently little electric contact together for keeping the flow of current from one wire to another substantially below the amperage necessary for sustaining a welding arc, the external portion of each outer wire being shaped, in cross-section, so as to offer an arc of contact as large as possible with a circle circumscribed about the strand of wires, whereby said electrode offers a maximum area for electrical contact with a contact tube in a welding gun.

9. A continuous semi-coated stranded electrode for semi-automatic arc welding comprising a core wire, a plurality of wires helically wound about said core, and continuous flux ribbons in the intervals between said wires, in which said wires have sufficiently little electric contact together for keeping the flow of current from one wire to another substantially below the amperage necessary for sustaining a welding arc, the external portion of each outer wire being shaped, in cross-section, so as to offer an arc of contact as large as possible with a circle circumscribed about the strand of wires whereby said electrode offers a maximum area for electrical contact with a contact tube in a welding gun, the flux being confined within a circle smaller than a circle circumscribed about the strand of wires.

References Cited in the file of this patent

UNITED STATES PATENTS

| | | |
|---|---|---|
| 1,361,269 | Mattice | Dec. 7, 1920 |
| 2,683,207 | Lewis et al. | July 6, 1954 |
| 2,697,771 | Robinson | Dec. 21, 1954 |
| 2,806,128 | Muller | Sept. 10, 1957 |

UNITED STATES PATENT OFFICE
CERTIFICATE OF CORRECTION

Patent No. 2,938,108

May 24, 1960

Charles Volff et al.

It is hereby certified that error appears in the above numbered patent requiring correction and that the said Letters Patent should read as corrected below.

In the grant, lines 1, 2, 3 and 4, for "Charles Volff, of Sevres, France, and Guy Savard, of Vaudreuil, Quebec, Canada; said Guy Savard assignor to l'Air Liquide, Societe Anonyme pour l'Etude et l'Exploitation des Procedes Georges Claude, of Paris, France," read -- Charles Volff, of Sevres, France, and Guy Savard, of Vaudreuil, Quebec, Canada, assignors to l'Air Liquide, Societe Anonyme pour l'Etude et l'Exploitation des Procedes Georges Claude, of Paris, France, --; lines 13, 14 and 15, for "Charles Volff, his heirs or assigns, and l'Air Liquide, Societe Anonyme pour l'Etude et l'Exploitation des Procedes Georges Claude, its successors" read -- l'Air Liquide, Societe Anonyme pour l'Etude et l'Exploitation des Procedes Georges Claude, its successors --; in the heading to the printed specification, lines 3, 4, 5 and 6, for "Charles Volff, Sevres, France, and Guy Savard, Vaudreuil, Quebec, Canada; said Guy Savard assignor to l'Air Liquide, Societe Anonyme pour l'Etude et l'Exploitation des Procedes Georges Claude, Paris, France" read -- Charles Volff, Sevres, France, and Guy Savard, Vaudreuil, Quebec, Canada, assignors to l'Air Liquide, Societe Anonyme pour l'Etude et l'Exploitation des Procedes Georges Claude, Paris, France --.

Signed and sealed this 13th day of December 1960.

(SEAL)
Attest:
KARL H. AXLINE
Attesting Officer

ROBERT C. WATSON
Commissioner of Patents